US009052671B2

(12) United States Patent
Song et al.

(10) Patent No.: US 9,052,671 B2
(45) **Date of Patent: *Jun. 9, 2015**

(54) METHOD FOR PAPER TREATMENT

(75) Inventors: Guiqin Song, Milton (CA); Edward G. Zwartz, Mississauga (CA); Nicoleta Mihai, Oakville (CA); Nan-Xing Hu, Oakville (CA); T. Brian McAneney, Burlington (CA)

(73) Assignee: XEROX CORPORATION, Norwalk, CT (US)

( * ) Notice: Subject to any disclaimer, the term of this patent is extended or adjusted under 35 U.S.C. 154(b) by 609 days.

This patent is subject to a terminal disclaimer.

(21) Appl. No.: 12/575,379

(22) Filed: Oct. 7, 2009

(65) Prior Publication Data

US 2010/0196819 A1 Aug. 5, 2010

Related U.S. Application Data

(63) Continuation-in-part of application No. 12/364,953, filed on Feb. 3, 2009.

(51) Int. Cl.
*G03G 13/00* (2006.01)
*B01J 19/08* (2006.01)
*G03G 15/00* (2006.01)
*G03G 8/00* (2006.01)

(52) U.S. Cl.
CPC .............. *G03G 15/6573* (2013.01); *G03G 8/00* (2013.01); *G03G 2215/00421* (2013.01)

(58) Field of Classification Search
USPC ............................ 430/126.1; 250/492.3, 324
See application file for complete search history.

(56) References Cited

U.S. PATENT DOCUMENTS

| | | | | |
|---|---|---|---|---|
| 4,029,827 | A | 6/1977 | Imperial et al. | |
| 4,101,686 | A | 7/1978 | Strella et al. | |
| 4,185,140 | A | 1/1980 | Strella et al. | |
| 4,188,140 | A | 2/1980 | Clemens et al. | |
| 5,157,445 | A | 10/1992 | Shoji et al. | |
| 5,441,838 | A * | 8/1995 | Pane | 430/97 |
| 5,592,879 | A * | 1/1997 | Waizmann | 101/416.1 |

(Continued)

FOREIGN PATENT DOCUMENTS

| | | | |
|---|---|---|---|
| EP | 2365392 | A1 | 9/2011 |
| JP | 07-152037 | A | 6/1995 |

(Continued)

OTHER PUBLICATIONS

European Application No. 11157273.1, Notification of European Publication No. and Information on the Application of Article 67(3) EPC, dated Aug. 18, 2011.

(Continued)

*Primary Examiner* — Tahseen N Khan
(74) *Attorney, Agent, or Firm* — Pillsbury Winthrop Shaw Pittman LLP

(57) ABSTRACT

Provided herein is a surface treatment method of oil contaminated xerographic prints which increases the adhesion of the print to levels close to the values corresponding to the original uncontaminated paper. Subjecting the contaminated surface to corona treatment alone and in combination with ultraviolet (UV) radiation and ozone can change the chemical structure of the surface of the paper in such a way that a highly polar surface is created as a consequence of this treatment, leading to enhanced adhesion properties of the xerographic print.

18 Claims, 5 Drawing Sheets

(56) References Cited

U.S. PATENT DOCUMENTS

| | | | | |
|---|---|---|---|---|
| 7,632,562 | B2 * | 12/2009 | Nair et al. | 428/213 |
| 7,858,279 | B2 * | 12/2010 | Halfyard et al. | 430/97 |
| 2002/0129833 | A1 * | 9/2002 | Drzal et al. | 134/1 |
| 2005/0220518 | A1 * | 10/2005 | Priebe | 399/390 |
| 2006/0290760 | A1 | 12/2006 | German et al. | |
| 2007/0021522 | A1 * | 1/2007 | Halfyard et al. | 522/18 |
| 2008/0057433 | A1 | 3/2008 | Anderson | |
| 2008/0071043 | A1 | 3/2008 | Ram | |
| 2008/0171199 | A1 | 7/2008 | Song | |
| 2008/0171826 | A1 | 7/2008 | Song | |
| 2008/0248196 | A1 | 10/2008 | Anderson | |
| 2008/0274420 | A1 | 11/2008 | Song | |
| 2009/0062464 | A1 | 3/2009 | Lee et al. | |
| 2009/0104373 | A1 | 4/2009 | Vanbesien et al. | |
| 2009/0184157 | A1 | 7/2009 | Sisler et al. | |
| 2009/0220877 | A1 * | 9/2009 | Kakino | 430/66 |
| 2009/0226831 | A1 * | 9/2009 | Kakino | 430/66 |

FOREIGN PATENT DOCUMENTS

| | | | |
|---|---|---|---|
| JP | 10333478 | A | 12/1998 |
| JP | 2007062027 | A | 3/2007 |

OTHER PUBLICATIONS

U.S. Appl. No. 12/263,258, filed Oct. 31, 2008, Guiqin Song et al.

* cited by examiner

METHOD FOR PAPER TREATMENT

CROSS-REFERENCE TO RELATED APPLICATIONS

This application is a continuation-in-part of U.S. application Ser. No. 12/364,953 filed Feb. 3, 2009, and which is expressly incorporated herein by reference.

BACKGROUND

The present disclosure generally relates to a paper treatment method that improves the wetting and adhesion properties of materials to an oil contaminated print. By subjecting the contaminated surface to corona treatment, the treated surface exhibits significantly improved adhesion to the treated surface. In additional embodiments, the contaminated surface is subjected to both corona treatment and the combined action of ultraviolet (UV) radiation and ozone. The UV radiation and ozone exposure can change the surface chemistry of the contaminated print allowing for favorable material/paper interactions leading to further improved adhesion.

In conventional xerography, electrostatic latent images are formed on a xerographic surface by uniformly charging a charge retentive surface, such as a photoreceptor. The charged area is then selectively dissipated in a pattern of activating radiation corresponding to the original image. The latent charge pattern remaining on the surface corresponds to the area not exposed by radiation. Next, the latent charge pattern is visualized by passing the photoreceptor by one or more developer housings comprising thermoplastic toner, which adheres to the charge pattern by electrostatic attraction. The developed image is then fixed to the imaging surface or is transferred to a receiving substrate, such as paper, to which it is fixed by a suitable fusing technique involving the application of heat, resulting in a xerographic print or toner-based print.

To ensure and maintain good release properties of the fuser roll, it has become customary to apply release agents to the fuser roll during the fusing process. These materials are applied as thin films of low surface energy liquids, for example, nonfunctional silicone oils or mercapto- or amino-functional silicone oils, to prevent toner offset.

U.S. Pat. No. 4,029,827 discloses the use of polyorganosiloxanes having mercapto functionality as release agents. U.S. Pat. No. 4,101,686 and U.S. Pat. No. 4,185,140 disclose polymeric release agents having functional groups such as carboxy, hydroxy, epoxy, amino, isocyanate, thioether, or mercapto groups. U.S. Pat. No. 5,157,445 discloses toner release oil having a functional organopolysiloxane.

The mechanism involved in the use of thin liquid films of fuser oils in two roll fuser systems to ensure release between the fuser roll surface and the thermoplastic toner is a dynamic cohesive failure or film splitting of the release oil in the diverging roll nip exit, leaving a barrier of fuser oil on both roll and the toner image surfaces. The residual film of release oil on the fused toner image and paper, which is referred to in this document as oil contamination, can cause problems with subsequent, end-use applications involving wetting or adhesion. After printing, images may experience a number of process treatments involving wetting and adhesion, including coating (as in overprint varnish application), lamination, application of adhesives (book-binding, post-it notes), thermal transfer printing (cheque post-encoding or bar code printing for example). Residual fuser oil present on the print image surface, typically as a discontinuous film, results in a complex surface energy gradient varying between low surface energy oil regions and relatively high surface energy toner and paper regions. Attempts to wet and adhere materials across this gradient results in numerous well-known surface tension related coating defects including pinholes, craters and reticulation for coating liquids and subsequent dried films; failure to achieve fiber tear when adhesive is applied to produce a joint as in the case of bookbinding or lamination; missing information in the case of thermal transfer printing. It has been shown that certain functionalized silicone fuser oils exhibit these problems to a greater extent than other release oils.

A number of patents have proposed solutions to these end-use application problems, such as U.S. Patent Publication Nos. US 2008/0057433; 2008/0171826; 2009/0062464; 2008/0248196; 2008/0274420; 2009/0104373; and 2008/0071043, and U.S. patent Ser. Nos. 12/016,524 and 12/263,258, all of which are hereby incorporated by reference in their entireties. These references involve a modification of the adhesive or coating material to improve wetting and adhesion over oil contaminated prints or the inclusion of an additional coating to act as a coupling or tie-coat layer; consequently, these solutions are application specific. By contrast, the invention proposed here acts directly on the oil contaminated print surface to generate bonding sites and significantly increase wetting adhesion potentially for all end-use applications which is seen as an advantage among available solutions.

SUMMARY

According to aspects illustrated herein, there is provided a method for treating a xerographic print, comprising providing a source of highly charged electrical ions, exposing the xerographic print to the highly charged electrical ions, providing a source of ultraviolet radiation wherein the ultraviolet radiation comprises at least a first wavelength and a second wavelength, exposing the xerographic print to the ultraviolet radiation in an ozone containing atmosphere.

In another embodiment, there is provided a method for forming a laminated article, comprising providing a xerographic print comprising a fused toner image on the surface, and a source of highly charged electrical ions, exposing the xerographic print to the highly charged electrical ions, providing a plastic film disposed over the xerographic print, wherein the plastic film comprises a plastic substrate, and an adhesive coating disposed on the surface of the plastic substrate, and subjecting the xerographic print and the plastic film to pressure and temperature to achieve lamination.

BRIEF DESCRIPTION OF THE DRAWINGS

For a better understanding, reference may be had to the accompanying figure.

Unless otherwise noted, the same reference numeral in different Figures refers to the same or similar feature.

DETAILED DESCRIPTION

Figure 1:
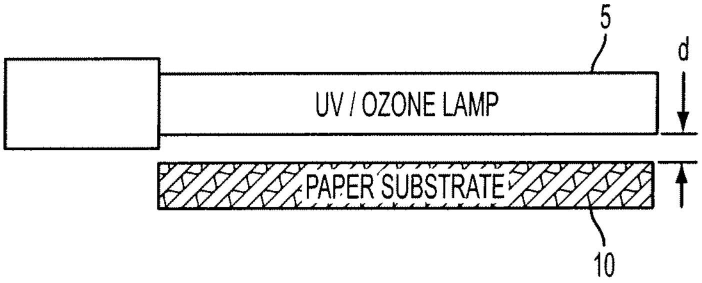
FIG. 1 represents a block diagram showing application of a method for removing release agent contamination from a print surface in accordance with the present embodiments.

As explained above, release agents are applied to the fuser roll to provide the release of a substrate containing an image thereon from the fuser roll after the toner image has been formed on the substrate. Thus, xerographic prints may be contaminated by a release agent such as poly(dimethylsiloxane) fuser oil due to the printing process. Some release agent may remain on a toner image that may cover any portion of the print and on the substrate itself. In other words, some release agent may remain on a final substrate having an image thereon and may at least partially cover a substrate having no toner image or a substrate having a toner image thereon. “Partially” refers to the release-agent covering from above 0 percent to less than 100 percent of the substrate, such as from about 10 percent to about 90 percent or from about 20 percent to about 80 percent of the substrate. The release agent may chemically bond to the surface of the prints because of the reactive functional group such as amino- or mercapto-functional group in fuser oil during fusing process at certain pressures and temperatures. Consequently, the surface free energy (SFE) of the contaminated prints may thus dramatically drop from a range of higher than about 30 mN/m for substrates such as paper (original, uncontaminated print) to a range of from about 8 mN/m to less than about 30 mN/m. Generally, commercially available hot melt adhesives bind to substrates having a SFE higher than about 30 mN/m. Thus, the oil contamination on the print has a negative impact on a variety of applications such as bookbinding, laminating, thermal transfer printing of bar codes, check post encoding and pressure sealed mailers.

Any release agent remaining on the substrate, with or without a toner image thereon, may be detrimental to an adhesive attempting to adhere to the substrate having a toner image. This is particularly important when the substrate is to be laminated or coated with a hot melt adhesive, such as an adhesive used in bookbinding. This release agent may also prevent materials utilizing adhesives, for example, POST-IT® notes, from adhering to the substrate.

Release agents used in releasing a substrate from a fuser roll in an imaging device include poly-ogranofunctional siloxanes, such as amino-functional silicone oils, such as methyl aminopropyl methyl siloxane, ethyl aminopropyl methyl siloxane, benzyl aminopropyl methyl siloxane, dodecyl aminopropyl methyl siloxane, aminopropyl methyl siloxane, and the like. In particular, the application of polydimethylsiloxane (PDMS) oil used commonly for release in xerographic fusing reduces the surface energy (e.g., dyne level) of the printed substrate. The effect is particularly strong in the case of amino-functionalized PDMS oil due to the hydrogen bonding at the paper/oil interface restricting diffusion of the oil below the paper surface. As a result of the reduced surface energy, many applications that involve adhesion to the print are adversely impacted. The present embodiments demonstrate the ability to improve adhesion despite the reduced surface energy of oil contaminated xerographic prints by using a corona treatment and/or combined UV radiation and ozone treatment.

Corona treatment, also known as air plasma, is a surface treatment process that improves the bonding characteristics of substrates such as paper, films, foils, and polymers by generating additional bonding sites. By subjecting the surface of xerographic prints to corona treatment, adhesion is improved, as evidenced by the presence of polar carbonyl groups created on the surface after corona treatment. In addition, application of ultraviolet (UV) radiation and ozone treatment to the surface of the xerographic prints likewise improves adhesion. Like corona treatment, UV radiation changes the surface chemistry of the contaminated print, as indicated by the presence of polar carbonyl groups created on the surface of the paper as a consequence of this treatment. By using the combined action of corona and UV/ozone to treat non-image areas of the oil contaminated print, additional bonding sites are generated which, although not large enough for the contact angle to be detected, improves adhesion such that the level of adhesion matches that of the original uncontaminated paper. Thus, the present embodiments employ the use of corona treatment and/or UV radiation and ozone treatment to greatly enhance the adhesion of the contaminated xerographic prints. Moreover, use of corona treatment with or without UV/ozone treatment provides the advantage of requiring far less treatment time than UV/ozone treatment alone.

The present embodiments involve the application of corona treatment through a corona treater, such as Models BD-20AC and BD-10ACV available from Electro-Technic Products Inc. (Chicago, Ill.). The corona discharge equipment generally comprises a high-frequency power generator, a high-voltage transformer, a stationary electrode, and a treater ground roll. Standard utility electrical power is converted into higher frequency power which is then supplied to the treater station. The treater station applies the power through ceramic or metal electrodes over an air gap onto the material’s surface.

The present embodiments also involve the application of UV radiation of two specific wavelengths to the paper to be treated. In embodiments, the UV radiation is produced by a low pressure mercury lamp. While not being limited to any specific theory, the UV radiation changes the surface chemistry of the contaminated print, as indicated by the presence of polar carbonyl groups created on the surface of the paper as a consequence of this treatment.

The action of the UV radiation is enhanced by the presence of ozone. The ozone can be produced as a by-product of the same UV lamp that emits two specific wavelengths. The first wavelength irradiates the paper surface which breaks contaminant molecules in the surface of the contaminated paper. Meanwhile, the second wavelength is absorbed by atmospheric oxygen which then dissociates into atomic oxygen and recombines to form ozone. By irradiating the oil contaminated printed paper with UV light of appropriate wavelength, the combined action of the UV radiation and ozone leads to the formation of polar groups on the surface of the paper. In most embodiments, the treatment time is no more than 25 minutes, or from about 5 minutes to about 25 minutes, thus providing an efficient manner to treat the printed paper before completing with a finishing adhesive, although the time period can be outside of these ranges. Treatment time can be as low as 1 second or less, provided that a high output lamp is being used. Tests have shown that the UV/ozone treated paper exhibits very good glue to paper adhesion.

One embodiment is a method comprising forming a toner-based image on a substrate, coated or uncoated paper for example, in a process that employs a fuser that uses fuser oil, the imaged substrate having low surface energy regions resulting from contact with fuser oil; at any time following fusing the print is exposed to corona treatment and, optionally, followed by UV radiation comprising two distinct wavelengths from the class designated UVC, so that the surface of the substrate, image and non-image areas, are exposed to both UV radiation energy and ozone. The ultraviolet radiation may be applied to the xerographic print at any point after fusing is completed. In embodiments, the ultraviolet radiation is applied by a UV output lamp. The ultraviolet radiation is applied to optimize treatment of the contaminated print by modifying the required distance between the UV output lamp and the xerographic printed paper, lamp intensity and exposure time. In a different embodiment, the UV/ozone treatment is applied prior to the corona treatment.

In embodiments, the print is exposed to corona treatment from about 9 mm per second to about 20 mm per second, or from about 10 mm per second to about 15 mm per second. The application of the corona treatment may be at a distance d from the surface of the print of from about 1 millimeters to about 5 millimeters, or from about 2 millimeters to about 3 millimeters. In further embodiments, the corona treatment may be applied from about 1 to about 15 times. After corona treatment, the formation of polar carbonyl groups are observed, which appears to be the cause of the improved adhesion of the prints. The longer the corona treatment is applied, the higher the probability of increasing the number of bonding sites. In specific embodiments, the print is subjected to 4 passes of the corona treatment.

In embodiments, the UV/ozone surface treatment comprises use of a first wavelength $\lambda_1$ that is within the range 100-210 nm, and more specifically 185 nm, and is absorbed by atmospheric oxygen leading to the formation of ozone. The second wavelength $\lambda_2$ is within the range 210-315 nm, and more specifically 254 nm, and is absorbed by most organic contaminants breaking them into free radicals and excited molecules. In embodiments, the UV lamp is placed a distance d of no more than about 5 millimeters from the surface of the print. In other embodiments, the distance d is from about 0 millimeters to about 20 millimeters. However, the distance can also be outside of these ranges. As a result of this UV/ozone surface treatment the surface energy of the oil contaminated substrate is increased to values very close to the initial surface energy of a non-printed paper. Exposing the non-image area to both UV radiation and ozone leads to changes in the substrate surface chemistry as illustrated by the presence of polar carbonyl groups. As a result the surface becomes highly polar after this treatment. Exposure to UV radiation as specified in this embodiment being of sufficient intensity, power and time to result in excellent adhesion for a range of typical end-use applications. In this embodiment the requirement to supply two classes of wavelength is important to controlling the method to time, power and intensity levels of UV radiation to operate within acceptable practical limits for this kind of application.

In specific embodiments, the method comprises providing a source of ultraviolet radiation where the UV radiation comprises at least a first wavelength and a second wavelength, applying the ultraviolet radiation to a xerographic printed paper contaminated with fuser oil as a result of the fusing process, and treating the xerographic printed paper with the ultraviolet radiation and ozone, wherein the surface energy of the contaminated print is substantially increased and the treated xerographic print subsequently exhibits excellent adhesion as a result of the UV/ozone surface treatment.

In the present embodiments, the surface energy of the print is determined from contact angle values of a first standard testing liquid and a second standard testing liquid with known surface tensions, wherein the first standard testing liquid is polar and the second testing liquid is dispersive. However, the surface energy can also be calculated by other means. In one embodiment, the first standard testing liquid is water and the second standard testing liquid is formamide and the third standard testing liquid is is diiodomethane and the surface free energy is calculated by Lewis Acid-Base method. The polar surface energy component as calculated from the contact angle values of water and diiodomethane is associated with the appearance of carbonyl groups on the surface of the surface treated contaminated print as measured by ATR/FTIR. By using UV/ozone treatment, surface energy and adhesion increased. As a result, the treated xerographic print exhibits excellent adhesion by an increase in the adhesive bond paper fiber tear measured on a non-imaged area from about 0 percent up to about 100 percent as a result of the UV/ozone surface treatment.

Another embodiment is a xerographic print comprising a substrate, which may be coated or uncoated paper for example, with a toner-based image printed thereon, including low surface tension regions resulting from the application of fuser oil which has been exposed to corona treatment under conditions such that the print exhibits improved adhesion approximately equal to that of substrates prior to fusing and contact with fuser oil. Another embodiment is a xerographic print comprising a substrate, which may be coated or uncoated paper for example, with a toner-based image printed thereon, including low surface tension regions resulting from the application of fuser oil which has been exposed to corona treatment and UV radiation under conditions such that the adhesion is further improved and in less treatment time. In such embodiments, it was discovered that although adhesion improved significantly, the surface energy did not increase significantly. Upon further investigation, it was discovered that, by using the combined action of corona treatment and UV radiation to treat non-image areas of the oil contaminated print, additional bonding sites are generated which, although not large enough for the contact angle to be detected, improves adhesion such that the level of adhesion matches that of the original uncontaminated paper.

For example, for the xerographic prints comprising a paper substrate, and a fused toner image on the paper substrate containing residual fuser oil contamination, wherein the xerographic print has been surface treated with corona treatment alone or in combination with UV radiation displays excellent adhesion. The xerographic print may contain residual fuser oil being functionalized or non-functionalized oil ranging from about 0.1 mg/copy to about 20 mg/copy. In addition, such xerographic prints exhibit excellent adhesion by an increase in the adhesive bond paper fiber tear measured on a non-image area from about 0 percent up to about 100 percent as a result of the UV/ozone surface treatment. For xerographic prints printed on the synthetic paper either using Emulsion Aggregation (EA) toner with wax incorporated or conventional toner without wax, the peel force increased dramatically for both toners after the corona treatment plus UV-Ozone treatment. In embodiments, the xerographic print is printed on a substrate selected from the group consisting of synthetic paper, plastic film and pre-print form.

As shown in FIG. 1, specific embodiments provide for a method for increasing the surface energy of an oil contaminated print by using a UV lamp, for example, a low pressure mercury Pen Ray Lamp (available from Cole-Parmer, Vernon Hills, Ill.). The UV lamp 5 is placed a distance d away from the surface of the contaminated paper 10. The distance d between the UV lamp 5 and the paper 10 affects the UV treatment efficiency, as the lamp intensity decreases with increasing this distance. A distance of a few millimeters between the lamp and the substrate has shown to provide effective treatment as well as avoid excessive absorption of the UV radiation in air. In embodiments, the distance d is no more than about 5 millimeters. In other embodiments, the distance d is from about 0 millimeters to about 20 millimeters. However, the distance can also be outside of these ranges. In addition, treatment efficiency can be affected by the UV output of the lamp used for this treatment. For example, by using higher output lamps, the treatment time can be reduced to seconds as well as anywhere between 0 and 1 second. When a higher UV output lamp is used, for example an amalgam lamp with a UV output power of 150 W (3 W/cm), available from Heraeus Noblelight (Hanau, Germany), the efficiency of the surface treatment applied to the print is significantly increased, by reducing the exposure time from 25 minutes to 100 seconds which is enough time to increase the surface energy of the oil contaminated print to levels that are within the normal range for end-use applications.

Figure 2:
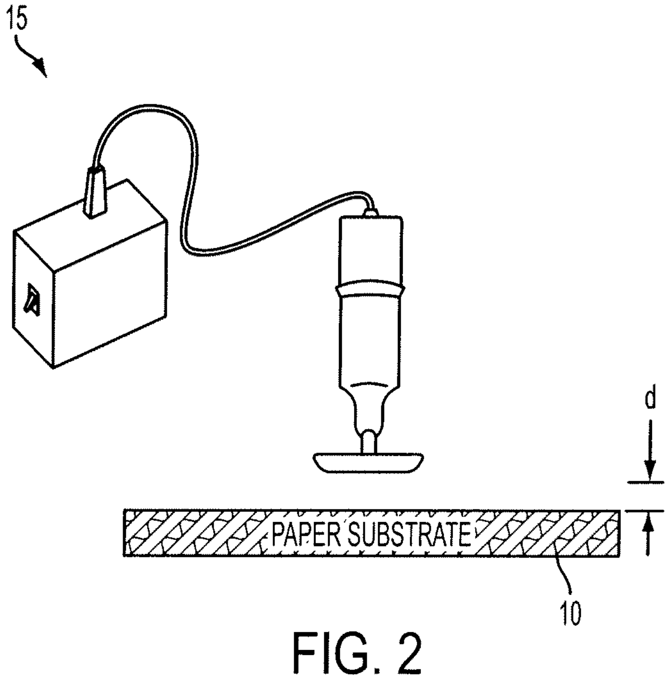
FIG. 2 represents a block diagram showing application of another method for removing release agent contamination from a print surface in accordance with the present embodiments.

As shown in FIG. 2, specific embodiments provide for a method for increasing the surface energy of an oil contaminated print by using a corona treater 15. The corona treater 15 is placed a distance d away from the surface of the contaminated paper 10. The distance d between the corona treater 15 and the paper 10 affects the corona treatment efficiency, as the intensity decreases with increasing this distance. A distance of a few millimeters between the corona treater 15 and the substrate 10 has shown to provide effective treatment. In embodiments, the distance d is no more than about 10 millimeters. In other embodiments, the distance d is from about 0 millimeters to about 5 millimeters. However, the distance can also be outside of these ranges. In embodiments using corona treatment, it was discovered that adhesion improved although surface energy was not significantly increased as compared with embodiments using only the UV treatment. The presence of additional carbonyl groups indicated that the corona and/or UV/ozone treatment provides new bonding sites which improve adhesion. Thus, the present embodiments provide an additional method for increasing the adhesion of an oil contaminated print by using corona treatment and/or UV/ozone treatment. The UV/ozone surface cleaning concept that is used towards removing the organic contamination was recognized by R. R. Sowell, R. E. Cuthrell in the Journal of Vacuum Science and Technology (Vol. 11, pages 474-475, January/February 1974), and the actual organic removal mechanism is described by J. R. Vig in the Handbook of Semiconductor Wafer Cleaning Technology ("Ultraviolet-Ozone Cleaning of Semiconductor Surfaces," page 233). It is surmised from Vig that the same cleaning effect may be achieved when the UV radiation and ozone are used separately but it would require much longer exposure time.

In the present embodiments, treating an oil contaminated print according to the present embodiments can improve adhesion of the print by about four times higher than that of the oil contaminated print. However, UV/ozone treatment alone takes more time than corona treatment alone or in combination with UV/ozone treatment to obtain the same adhesion level. As a result of the paper treatment, the present embodiments provide a method by which to treat oil contaminated paper such that the paper subsequently exhibits excellent adhesion and related properties associated with a variety of finishing operations. For example, in embodiments, the treated paper exhibits an increase in paper fiber tear from about 0 percent up to about 100 percent, or from about 85 percent up to about 100 percent. Thus, the present embodiments provide methods for increasing and improving adhesion, but with minimal treatment time.

There is also provided in embodiments, a method for forming a laminated article, comprising providing a xerographic print comprising a fused toner image on the surface, and a source of highly charged electrical ions, exposing the xerographic print to the highly charged electrical ions, providing a plastic film disposed over the xerographic print, wherein the plastic film comprises a plastic substrate, and an adhesive coating disposed on the surface of the plastic substrate, and subjecting the xerographic print and the plastic film to pressure and temperature to achieve lamination. In such embodiments, the xerographic print contains residual fuser oil being functionalized or non-functionalized ranging from about 0.1 mg/copy to about 20 mg/copy and may have a surface free energy of the xerographic print is less than 35 mN/m. While the surface free energy of the untreated xerographic print is less than 35 mN/m, the surface free energy of the xerographic print is increased after the treatment. In specific embodiments, the corona surface treatment of exposing the xerographic print to the highly charged electrical ions is applied by a corona treater such as a corotron, scorotron or a bias charge roller. The plastic substrate is, in embodiments, selected from the group consisting of polyethylene, polypropylene, poly(vinyl chloride), polyester, and mixtures thereof. The adhesive coating is, in embodiments, selected from the group consisting of a hot melt adhesive, a pressure sensitive adhesive, and a thermal plastic resin. In further embodiments, the adhesive coating is ethylene vinyl acetate copolymer with a vinyl acetate content ranging from about 5 percent to about 30 percent. In yet further embodiments, the high pressure may be from about 5 psi to about 2000 psi and the high temperature may be from about 50° C. to about 200° C. The adhesive coating thickness may be from about 5 microns to about 10 millimeters.

Various exemplary embodiments encompassed herein include a method of imaging which includes generating an electrostatic latent image on a xerographic surface by uniformly charging a photoreceptor; a thermoplastic toner is then transferred to the charged area by electrostatic attraction and the developed image is fixed in a fusing process involving the application of heat and pressure.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The example set forth herein below is illustrative of different compositions and conditions that can be used in practicing the present embodiments. All proportions are by weight unless otherwise indicated. It will be apparent, however, that the embodiments can be practiced with many types of compositions and can have many different uses in accordance with the disclosure above and as pointed out hereinafter.

Example 1

A corona treater (Model BD-20AC) available from Electro-Technic Products Inc. (Chicago, Ill.) was used to treat xerographic prints. This model can be used in low volume production work for treating very small parts.

UV/ozone treatment was also subjected to the xerographic prints via an UV/ozone treatment apparatus: UV static test fixture (enclosed in box with exhaust vent) with HERAEUS amalgam UV ozone generating lamp was used (185 nm+254 nm) (47 cm length). Intensity of 150 W (3 W/cm) was used and the lamp was located 2.9 mm from the substrate. Blower fans were directed down towards the substrate.

The lab scale corona treated speed range was from about 9 mm/s to about 20 mm/s. Production would go faster or use more wires. The treated time is dependent upon the speed range of the treater. The corona treatment can be applied either before or after the UV/ozone treatment. The distance from the prints can be from about 1 mm to about 5 mm.

Test Results:

The gluability was tested by using an in-house made tester which simulates a commercial machine binding application. The tester was composed of a draw down coater and laminator. The coater plate is composed of two parts. Temperature can be controlled separately. To simulate a book-binding machine, only the top portion of the coater plate is heated up to the glue application temperature. The paper to be glued was kept cold. Glue was melted first on the hot plate and then transferred to the paper by a MAYER rod. Another sheet of paper was put on top of the glue to make a sandwich-like arrangement. The sandwich arrangement was placed under the laminator and then compression was applied with controlled pressure and time. Afterwards, the sandwich arrangement is taken out and allowed to cool. The sandwich was then peeled by hand and visually inspected for the fiber tear. The higher the fiber tear, the better the adhesion. Results of the gluability (fiber tear) tests on prints subjected to combination corona and UV/ozone treatment are shown in Table 1.

TABLE 1

| Run | UV/ozone Exposure (seconds) | Substrate | Corona Treatment | Gluability by US661 Fiber Tear (percent) Test 1 | Test 2 | Average |
|---|---|---|---|---|---|---|
| 1 | 60 | Productolith with FFI (fuser oil) | No | 0 | 0 | 0 |
| 2 | 100 | Productolith with FFI (fuser oil) | No | 30 | 5 | 17.5 |
| 3 | 0 | Productolith with FFI (fuser oil) | Yes | 0 | 0 | 0 |
| 4 | 30 | Productolith with FFI (fuser oil) | Before | 80 | 90 | 85 |
| 5 | 60 | Productolith with FFI (fuser oil) | Before | 100 | 100 | 100 |
| 6 | 60 | Productolith with FFI (fuser oil) | After | 100 | 100 | 100 |
| 7 | 60 | Productolith with FFI (fuser oil) | Before | 100 | 100 | 100 |
| 8 | 100 | Productolith with FFI (fuser oil) | Before | 100 | 100 | 100 |

For samples with only UV/ozone irradiation at 60 s to 100 s, there was almost no fiber tear observed (Runs 1 and 2). Color deterioration was observed on both sheets, at 60 s and 100 s. For sample with only corona treatment, there was no fiber tear observed neither (Run 3). For samples with corona treatment plus UV/ozone irradiation at as low as 30 s, the acceptable fiber tear was observed and there is no perceivable color deterioration observed (Run 4).

Tables 2 and 3 show contact angle and surface free energy results of UV/ozone combined treated prints, respectively.

TABLE 2

| Paper Description | Surface Free Energy (mN/m) LW | − | + | Total |
|---|---|---|---|---|
| Original Paper | 32.9256066 | 10.86880863 | 3.741952026 | 45.68030149 |
| Paper with FFI (fuser oil) | 11.11376749 | 3.712303671 | 0.04505935 | 11.93175035 |
| Treated | 15.39652711 | 10.66025607 | 0.562800502 | 20.29534226 |
| Treated | 17.18725664 | 8.25664365 | 0.227183941 | 19.9264367 |
| Treated | 19.58809893 | 3.904488709 | 0.236989572 | 21.51197326 |
| Treated | 21.76177374 | 20.63713643 | 0.001221091 | 22.07926276 |

In Table 2, "LW" stands for the dispersive component, "+" represents the acid component, and "−" represents the base component.

Normally commercially available hot melt adhesive cannot bind the oil contaminated prints with the surface energy below 25 mN/m. However, it appears that the corona and UV/ozone combined treatment does not remove the oil contaminants (and only slightly increased surface energy), but instead it generates the bonding sites for hot melt adhesives and these bonding sites are not large enough for the contact angle to be detected.

As seen in Table 4, oil on copy results showed that the corona treatment did not reduce oil on copy as measured by ICP and this result is very consistent with the contact angle and surface free energy results.

TABLE 4

| ID# | # of Corona Passes | mg/copy |
|---|---|---|
| 1 | 0 | 3.74 |
| 2 | 1 | 3.68 |
| 3 | 2 | 2.69 |
| 4 | 3 | 2.96 |
| 5 | 4 | 3.09 |

Figure 3A:
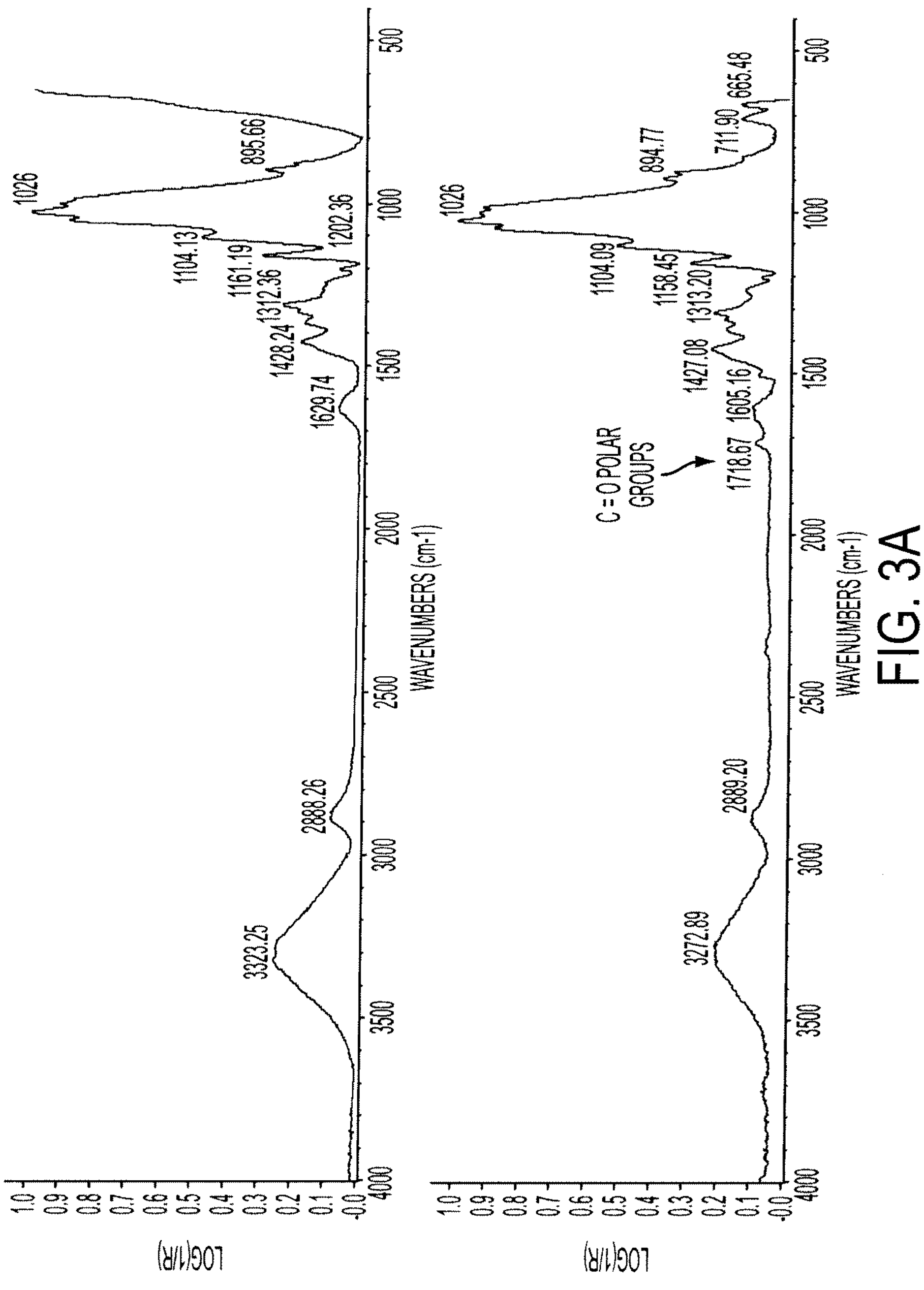
FIG. 3A shows Attenuated Total Reflection Fourier Transform Infrared Spectroscopy (ATR/FTIR) graphical results at lower resolution of corona surface treatment on test substrate in accordance with the present embodiments.
Figure 3B:
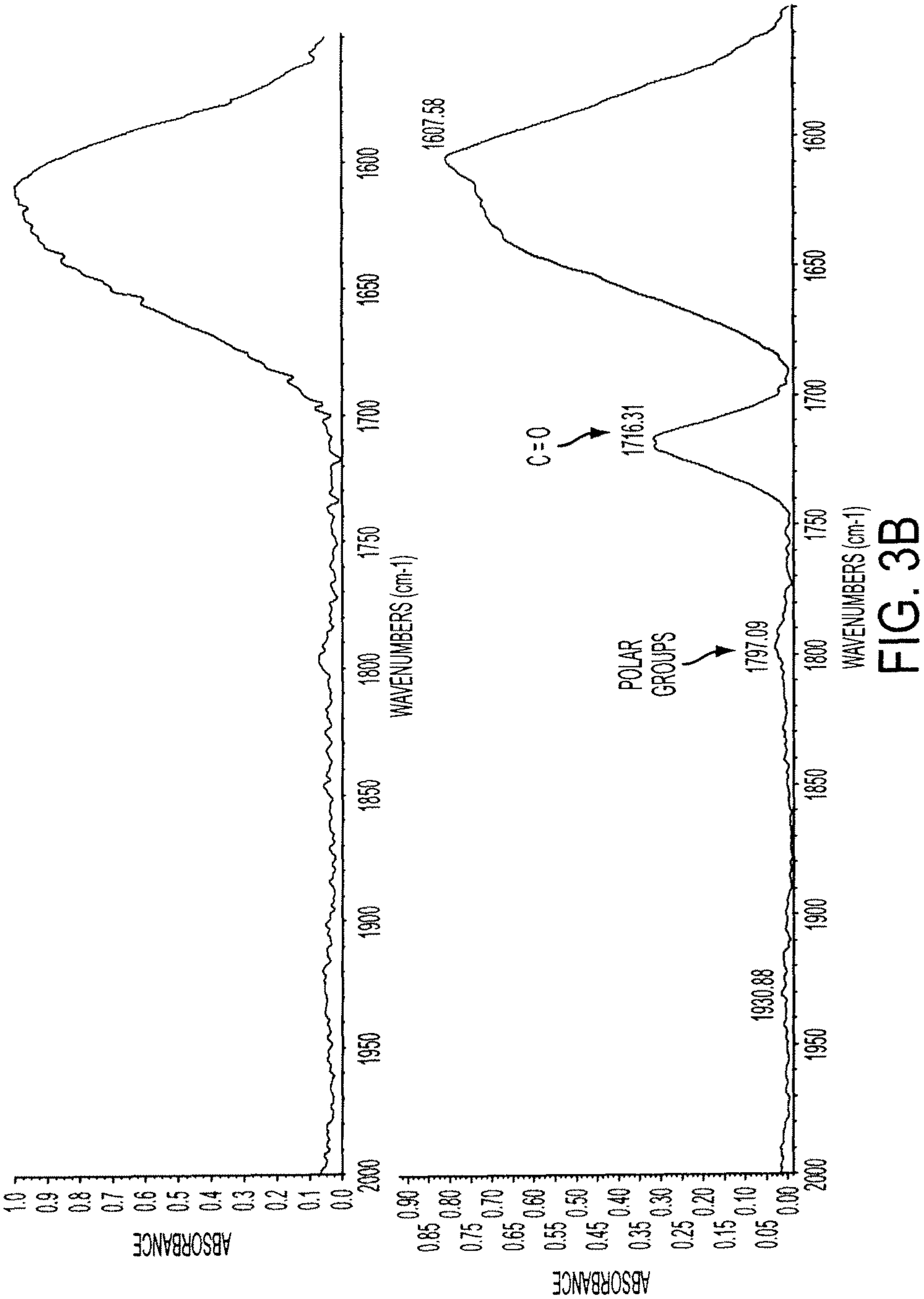
FIG. 3B shows ATR/FTIR graphical results at higher resolution of corona surface treatment on test substrate in accordance with the present embodiments.

As seen in FIGS. 3A-3B, FTIR results at lower and higher resolution of corona treatment on the print is illustrated. Low resolution FTIR spectra did not show the presence of any new peaks but if the corona treatment is increased 15 times, a new peak which represents the polar group C═O is observed according to the low resolution FTIR spectra (FIG. 3A). Polar groups were also observed on corona treated samples which underwent less corona passes, e.g., 4 passes, as shown by the higher resolution FTIR spectra in FIG. 3B. These polar groups created on the surface of the paper after the corona treatment may explain the improved adhesion of the prints as shown by the fiber tear data.

A Bias Charge Roller (BCR) system for electrophotographic equipment can also offer a more eco-friendly alternative to the corona wire. It is believed that the BCR treatment and UV/ozone irradiation combination will give the same results as corona and UV/ozone treatment.

Conclusions: the combined treatment of corona with UV/ozone on xerographic prints with oil contamination can significantly improve the adhesion of the prints to the book-binding hot melt adhesives without causing color deterioration.

Example 2

A corona treater (Model BD-20AC) available from Electro-Technic Products Inc. (Chicago, Ill.) was used to treat xerographic prints. This model can be used in low volume production work for treating very small parts. The lab scale corona treated speed range was from about 9 mm/s to about 20 mm/s. Production would go faster or use more wires. The treated time is totally dependent on the speed range of the treater. The corona treatment can be applied either before or after the UV/ozone treatment. The distance from the prints can be from about 1 mm to about 5 mm.

Laminating samples were prepared as follows: xerographic prints printed on synthetic paper (DURAPAPER) with two different toners (EA and iGEN3, available from Xerox Corp. (Stamford, Conn.)) and were laminated with 2.65 ml polyethylene terephthalate (PET) film (polyester with 7 mil ethylene vinyl acetate copolymer with melt index 15 and vinyl acetate content 16 percent), available from GBC International Services SPRL (Waterloo, Belgium). Kapton tape (high temperature 3M SCOTCH Brand 5490 with 1 inch width) was used on top of the edge of the PET film to create one inch gripping lead edge. A pouch laminator (GBC3500 PRO series) from GBC International Services SPRL was used to laminate. The laminating temperature was at 150° C. (highest) and the laminating speed was set at Dial Setup 1=8 inches/minute (lowest). The specimen dimension was 15 mm×200 mm. Peel strength and peel force measurement by an INSTRON machine, available from Instron Worldwide Headquarters (Norwood, Mass.).

Peel strength and peel force was measured by following the ASTM D1876-01 "Standard Test Method for Peel Resistance of Adhesives":

1. Instron Load Cell: 50N
2. Peel Speed: 254 mm/min
3. Peel Length: 150×2=300 mm
4. 5 replicates for each measurement Table 5 shows how the peel strength or peel force was dramatically improved after the corona treatment.

TABLE 5

| Average Load at Average Value (Integral)(N) | | | |
|---|---|---|---|
| DURAPAPER - 100 percent EA Solid Black Toner | | DURAPAPER - 100 percent iGEN3 Solid Black Toner | |
| No Corona | With Corona | No Corona | With Corona |
| 8.3247 | 11.0808 | 6.3249 | 12.2735 |
| 8.4470 | 9.6790 | 6.7998 | 12.2431 |
| 8.3166 | 10.0436 | 7.0667 | 12.1807 |
| 7.6909 | 10.5581 | 6.2832 | 12.1177 |
| 8.5412 | 9.9141 | 5.6744 | 12.4759 |
| AVERAGE | | | |
| 8.3 | 10.3 | 6.4 | 12.3 |

Figure 4:
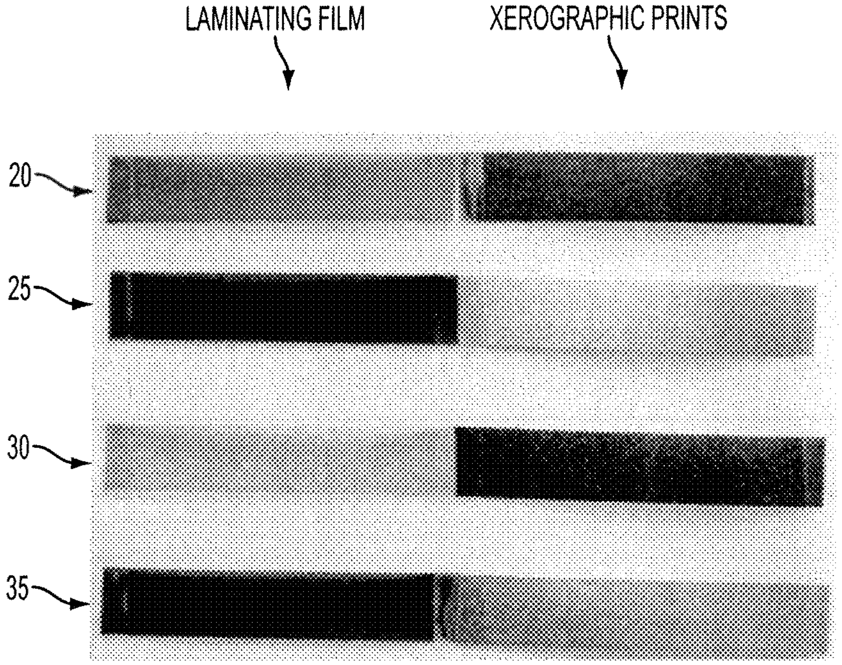
FIG. 4 shows a photograph of a comparison of laminating film and xerographic prints with and without corona treatment after being subjected to a peel test to demonstrate the effects of the present embodiments.

FIG. 4 is a photograph showing laminating film and xerographic prints comparison with and without corona treatment. In FIG. 4, comparisons are made on xerographic prints printed with EA toner without corona treatment 20, xerographic prints printed with EA toner with corona treatment 25, xerographic prints printed with iGEN3 toner without corona treatment 30, and xerographic prints printed with iGEN3 toner with corona treatment 35.

FIG. 4 demonstrated that the failure layer switched from "between toner and adhesive" to "between toner and substrate." Before the corona treatment, most toner remained on the synthetic substrate after the sample sandwich was peeled and the failure was caused by the weak bonding between toner and adhesive. After the corona treatment, however, most of the toner was transferred onto the PET laminating film. The failure is caused by the weak bonding between toner and substrate. Also FIG. 4 shows that the iGEN3 toner has a stronger bonding on the synthetic media than that of EA toner.

Conclusions: Corona treatment can dramatically improve the adhesion property of lamination when xerographic prints printed on synthetic media laminated with films while the prints have toner coverage over 50 percent with oil contamination, or with waxes on the surface.

The above results of the reduction to practice of the present embodiments demonstrate the discovery that corona treatment alone and with UV radiation and ozone applied in the inventive manner described herein provides an effective method which generates bonding sites of an oil contaminated print that exhibits significantly improved adhesion properties as a direct result of this treatment.

All the patents and applications referred to herein are hereby specifically, and totally incorporated herein by reference in their entirety in the instant specification.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A method for treating a xerographic print, comprising:
providing a source of highly charged electrical ions;
directly exposing a xerographic print to the highly charged electrical ions, wherein the xerographic print comprises a fused toner image with oil contamination;
providing a source of ultraviolet radiation wherein the ultraviolet radiation comprises at least a first wavelength and a second wavelength;
directly exposing the xerographic print to the ultraviolet radiation in an ozone containing atmosphere;
generating bonding sites in the oil contaminated print from the treatment with the highly charged electrical ions, ultraviolet radiation and ozone to increase adhesion properties of the print, wherein the surface free energy of the untreated xerographic print is less than 35 mN/m, and is increased after the treatment.

2. The method of claim 1, wherein exposing the xerographic print to the highly charged electrical ions is achieved by a corona treater, the corona treater being selected from the group consisting of a corotron, a scorotron, and a bias charge roller.

3. The method of claim 1, wherein the ultraviolet radiation source comprises at least a first wavelength $\lambda_1$ of from about 210 nm to about 315 nm and a second wavelength $\lambda_2$ of from about 100 nm to about 210 nm.

4. The method of claim 1, wherein the ultraviolet radiation is applied to the xerographic print either before or after the surface treatment of exposing the xerographic print to the highly charged electrical ions.

5. The method of claim 1, wherein the xerographic print is printed on a substrate selected from the group consisting of paper, plastic film and pre-print form.

6. The method of claim 1, wherein the xerographic print contains a fused toner image disposed on a substrate, the fused toner image comprising emulsion aggregation toner and wax.

7. The method of claim 6, wherein the fused toner image covers the substrate from greater than 0 percent to about 50 percent.

8. A method for forming a laminated article, comprising:

providing a xerographic print comprising a fused toner image with oil contamination on the surface of a substrate, providing a source of highly charged electrical ions, and a source of ultraviolet radiation wherein the ultraviolet radiation comprises at least a first wavelength and a second wavelength;

directly exposing the xerographic print to the highly charged electrical ions;

directly exposing the xerographic print to the ultraviolet radiation in an ozone containing atmosphere;

generating bonding sites in the oil contaminated print from the treatment with the highly charged electrical ions, ultraviolet radiation and ozone to increase adhesion properties of the print, wherein the surface free energy of the untreated xerographic print is less than 35 mN/m, and is increased after the treatment;

providing a plastic film disposed over the xerographic print, wherein the plastic film comprises a plastic substrate, and an adhesive coating disposed on the surface of the plastic substrate; and subjecting the xerographic print and the plastic film to pressure and temperature to achieve lamination.

9. The method for forming a laminated article of claim 8, wherein the xerographic print contains residual functionalized or non-functionalized fuser oil ranging from about 0.1 mg/copy to about 20 mg/copy.

10. The method for forming a laminated article of claim 8, wherein the exposing the xerographic print to the highly charged electrical ions is achieved by a corona treater selected from the group consisting of a corotron, a scorotron, and a bias charge roller.

11. The method for forming a laminated article of claim 8, wherein the xerographic print is printed on a substrate selected from the group consisting of paper, plastic film and pre-print form.

12. The method for forming a laminated article of claim 8, wherein the fused toner image comprises emulsion aggregation toner and wax.

13. The method for forming a laminated article of claim 8, wherein the plastic substrate is selected from the group consisting of polyethylene, polypropylene, poly(vinyl chloride), polyester, and mixtures thereof.

14. The method for forming a laminated article of claim 8, wherein the adhesive coating is selected from the group consisting of a hot melt adhesive, a pressure sensitive adhesive, and a thermal plastic resin.

15. The method for forming a laminated article of claim 8, wherein the adhesive coating is ethylene vinyl acetate copolymer with a vinyl acetate content ranging from about 5 percent to about 30 percent.

16. The method for forming a laminated article of claim 8, wherein the pressure is from about 5 psi to about 2000 psi.

17. The method for forming a laminated article of claim 8, wherein the temperature is from about 50°C. to about 200° C.

18. The method for forming a laminated article of claim 8, wherein the adhesive coating thickness is from about 5 microns to about 10 millimeters.

* * * * *